United States Patent [19]

Bleyle

[11] 4,119,746
[45] Oct. 10, 1978

[54] CROSS-LINKING RESIN SATURANT AND METHOD

[75] Inventor: Merrill Bleyle, Waltham, Mass.

[73] Assignee: W. R. Grace & Co., Cambridge, Mass.

[21] Appl. No.: 806,447

[22] Filed: Jun. 14, 1977

[51] Int. Cl.$^2$ .............................................. B32B 27/00
[52] U.S. Cl. ...................... 427/381; 260/29.4 UA; 260/29.6 TA; 427/385 B; 427/389; 427/391; 427/392; 428/290; 264/137
[58] Field of Search .............. 260/29.4 UA, 29.6 TA; 428/290; 427/381, 385 B, 389, 391, 392; 264/137

[56] References Cited

U.S. PATENT DOCUMENTS

| | | | |
|---|---|---|---|
| 2,897,094 | 7/1959 | Hayes et al. | 427/342 X |
| 2,959,821 | 11/1960 | Kolb | 18/58.6 |
| 2,984,588 | 5/1961 | Granlich et al. | 427/389 X |
| 3,037,963 | 6/1962 | Christenson | 260/72 |
| 3,231,533 | 1/1966 | Garrett et al. | 260/29.6 |
| 3,240,740 | 3/1966 | Knapp et al. | 260/29.6 |
| 3,296,860 | 4/1966 | Richardson et al. | 427/391 X |
| 3,344,103 | 9/1967 | Eilbeck et al. | 260/29.7 |
| 3,397,165 | 8/1968 | Goodman et al. | 260/29.7 |
| 3,985,929 | 10/1976 | Bonin et al. | 428/290 |
| 4,007,147 | 2/1977 | Leeson | 260/29.4 UA |
| 4,028,294 | 6/1977 | Brown et al. | 260/29.6 NR |

*Primary Examiner*—Michael R. Lusignan
*Attorney, Agent, or Firm*—Lowell H. McCarter; C. Edward Parker

[57] ABSTRACT

Porous, fibrous materials such as non-woven polyester or polypropylene web materials, cotton web, paper and other materials are saturated with a storage stable one-package latex composition. The latex composition is modified with a temperature sensitive cross-linking agent and neutralizing agents. The latex composition is tailored such that a fibrous material may be impregnated and dried at controlled temperature whereby a thermoplastic resin saturant web intermediate stock material having thermoset properties is produced. The cross-linking system in the latex composition is later activated in a specific manufacturing process at heat forming and molding temperatures to obtain a specifically shaped manufacture of desired rigidity and flexibility.

10 Claims, No Drawings

CROSS-LINKING RESIN SATURANT AND METHOD

FIELD OF INVENTION

This invention relates to latex cross-linking web saturants particular suited for impregnating porous, fibrous materials to improve the physical properties thereof and to the impregnated products produced thereby. In a particular aspect, the invention concerns a novel impregnating composition which is comprised of a latex composition modified with N-methylolacrylamide. The modified latex is buffered from a manufactured acid state to a neutral state with a neutralizing agent to prevent premature cross-linking in storage and during the drying of the saturated webs.

This invention finds application where a thermoset impregnated web has utility. The saturated web will find use in shoe manufacture processes and other situations where a filler or backing material requiring rigidity with controlled flexibility is necessary during and after the manufacturing process.

The art has recognized that enhancement of physical properties of polymer-impregnated sheet material can be accomplished by additional treatment of the sheet with certain additives incorporated either in the impregnated composition or in the form of a post-impregnation treatment. U.S. Pat. No. 3,269,860 to Richardson et al describes a method for improving the delamination resistance and wet tensile strength of rubber latex saturated paper by incorporating an adduct of an isocyanate in the impregnating composition, drying the saturated paper web and heating the saturated paper web, usually at a temperature above about 285° F., to release or activate the reactive group of the isocyanate adduct which persumably reacts with the rubber latex in the saturated paper and/or the paper itself.

SUMMARY

The composition of this invention can be used in a process where an intermediate stock material having thermoplastic characteristics is prepared. This stock material can then be stored until a manufacturing process molds the stock material at elevated temperatures when the crosslinking occurs to form a rigid product of controlled flexibility. This novel composition provides a means to avoid a second saturation dipping step to add the cross-linking agent. The novel composition consists essentially of from about 40 to about 70%, preferably 59%, by weight of a first monomer selected from styrene, vinylidene chloride, methyl methacrylate; butyl methacrylate and mixtures thereof, from about 60 to about 30% preferably 41% by weight of a second monomer selected from methylacrylate, ethylacrylate, butylacrylate, propylacrylate, 2-ethylhexylacrylate and mixtures thereof; and from about 0.5 to about 6.0%, preferably 2% based on monomers, by weight of N-methylolacrylamide. The latex composition has incorporated therein, in addition to the heat reactive cross-linking monomer N-methylolacrylamide, a sufficient amount of a neutralizing agent to adjust the pH value of the composition to 7.0 ± 1.0 so that a web saturated with the composition may be dried at temperatures up to 190° F. without activating the cross-linking reaction. The dried web can thereafter be cross-linked at temperatures above 190° F. to provide a thermoset product.

The novel process for preparing a saturated thermoset non-woven web having a cross-linking activation temperature above 190° F. comprises the steps of preparing the composition described above, saturating a non-woven web with the composition, drying the composition saturated web at a temperature below the cross-linking activation temperature whereby a thermoplastic intermediate stock material having thermoset properties is produced.

DESCRIPTION

The porous, fibrous material which can be treated according to the invention includes porous woven and non-woven fiberous materials made conventionally from natural and synthetic fibers including cotton, asbestos, acetate, rayon, polyester, polyamide, polyvinyl alcohol, nylon, etc. as well as mixtures thereof. The composition of the invention has been found to be especially suited for treating porous, non-woven polyester web.

Porous, fibrous materials may be impregnated by dipping or immersing a sheet of the material into a bath containing the latex composition followed by squeeze rolling to remove the excess latex composition. The impregnated sheet is then dried for a limited period of time, i.e. 2 to 10 minutes, at a controlled temperature, i.e. below about 190° F. Sheets prepared in this manner are not cross-linked but are considered to be an intermediate product to be used in a later molding and forming operation where the cross-linking and curing occur.

In a commercial operation the web material is supplied on large reels. The web is continuously unwound and fed through a saturating pan where it is immersed in the saturating latex composition. The saturated web is then fed through one or more controlled temperature drying furnaces. In a preferred mode the saturated web emerges vertically from the saturating bath whereby any excess latex composition may be removed by gravity or squeeze rollers. Guide rollers feed the wet web into a vertical tower dryer. Additional guide rollers effectuate the web travel from a vertical to horizontal direction as the partially dry web follows zig-zag course in a generally horizontal direction through a tunnel dryer. The temperature of the dryers and the speed of the web are controlled so that the temperature of the exiting web is not above 180° F. The saturated and dried web is spooled upon a take-up reel.

In a trial, webs of varying thickness were run through the process at approximately 15 to 18 feet per minute. The saturation pan was continuously fed with the latex composition. The saturated sheet went directly into a vertical tower dryer located 3-4 feet above the saturation pan, exiting in a horizontal plane into a tunnel dryer and finally to the wind-up stand. The dryer temperatures were varied from 150° F. (56° C.) to 230° F. (110° C.) in order to attain an exit web temperature of less than 190° F. and preferably about 180° F. The dryer temperature variations were due to the various base weight webs being processed.

The treated materials of the invention exhibit a porous fibrous structure containing fibers that are bonded or connected by the polymeric particles. The amount of latex composition in the porous fibrous material usually will range between about 9 to 16 oz. per square yard of non-woven structure, and preferably, about 12 to 15 oz. per square yard.

The latex component used in the composition of this invention is a copolymer of a first monomer selected form styrene, vinylidene chloride, methyl methacrylate, butylmethacrylate and mixtures thereof with a second monomer selected from methylacrylate, ethylacrylate, butylacrylate, propylacrylate, 2-ethylhexylacrylate and mixtures thereof. The cross-linking agent, N-methylolacrylamide, is specifically selected for its heat sensitive characteristics of not precross-linking when in combination with a neutralizing agent at pH values 7.0 ± 1.0.

Polymerization can be effected by simply combining monomers, emulsifier, initiators, etc. in a reaction vessel. Alternatively, and, preferably, the latex component of the invention is prepared by carrying out the aqueous polymerization reaction in the presence of a "seed" latex with continuous addition of monomer and emulsifier as is more fully described in U.S. Pat. No. 3,397,165 to Goodman et al. The emulsifiers and initiators useful within the scope of this invention are fully set forth in U.S. Pat. No. 3,397,165, the disclosure of which is incorporated by reference herein.

Briefly the method comprises introducing into the reaction vessel a relatively small amount of a polymer latex "seed" to provide nucleating sites for polymerization and adding, substantially continuously the first and second monomers along with the cross-linking agent and emulsifiers. The rate at which the monomers are added is such that the added monomers are associated with the polymer particles essentially as soon as the monomers enters the reaction zone, the formation of a separate monomer phase being prevented. The rate of emulsifier addition added continuously during polymerization to get good particles size distribution, is proportional to the rate of growth of particles surface area. Preferably the monomers are added continuously to the aqueous phase at about 150° F. over about 4½ hours. After polymerization is completed a post-cook treatment of about 3 hours may be used to reduce the free monomer and to add the neutralizing agent to the latex composition. The buffering, using neutralizing materials, to pH range of 6-8 provides, a storage stable of one component web saturant capable of being dried up to temperature of about 180° F. ± 10° F. to produce thermoplastic intermediate stock material that has thermoset properties upon being subjected to a heat forming and molding operation.

I have found it necessary to use the "seed" latex technique described above in order to obtain a commercially viable product. The seed latex method with continuous emulsifier addition must be used to obtain a uniform product having good particle size distribution, and stability necessary for a one package cross-linking latex saturant having a minimum shelf-life of at least 1 year.

Using the polymerization process described above I have found it necessary to limit the amount of cross-linking agent N-methylolacrylamide to 6% or less. When more than 6% N-methylolacrylamide is added to the monomer phase coagulation in the latex occurs giving a lumpy saturant (having golf balls size lumps) that cannot be evenly distributed in and on the web. At least about 0.5% N-methylolacrylamide is required to provide a thermoplastic intermediate stockmaterial that will provide sufficient rigidity upon being thermoset in the molding and forming process.

While I do not want to be bound by theoretical considerations it is believed that two critical components provide the novelty of the inventive compositions herein. These components are the N-methylolacrylamide which provides the cross-linking back bone to the latex material and the buffering action of the neutralizing agent. I have found other cross-linking monomers such as N-(isobutoxy methyl) acrylamide may be used. However webs saturated with a N-(isobutoxy methyl) acrylamide modified latex require higher heat activation to begin the cross-linking reaction and require longer dwell times in the molding operation and thus the impregnated webs are not commercially viable.

The neutralizing agents used in the final step of the preparation of the one package composition have the characteristic of adjusting the pH value from the as manufactured value to a pH range of 6.0–8.0. Further, the neutralizing agent is characterized to the extent that it, in combination with N-methylolacrylamide, inhibits premature cross-linking during storage of the latex composition and the drying of the saturated web yet does not interfer with the cross-linking mechanism during the later molding and forming operations. As used herein the term neutralizing agent means any base or buffer that does not interfer with the cross-linking reaction at molding and forming temperatures as hereinafter discussed. Preferably the neutralizing agent is volatile.

Neutralizing agents that have found utility in this invention include ammonium hydroxide, sodium hydroxide, potassium hydroxide, morpholine, methylamine and dimethylamine. The preferred neutralizing agent is ammonium hydroxide because of its volatility and relatively low cost.

Accelerated heat ageing tests have indicated a minimum of a one year shelf-like for the latex composition of this invention.

The first monomer, i.e. styrene, vinylidene chloride, methylmethacrylate, butylmethacrylate, and mixtures thereof, is selected to impart rigidity, hardness and chemical resistance to the final molded product. The second monomer component, i.e., methylacrylate, ethylacrylate, butylacrylate, propylacrylate, 2-ethylhexylacrylate and mixtures thereof contributes flexibility, color stability and durability to the cured saturated web. The third principal component, N-methylolacrylamide, provides heat a sensitive cross-linking mechanism to the final product.

For the purpose of illustrating the preferred embodiment of the invention reference will be made to a specific manufacture and end use of the product. The examples that follow therefore are not to be construed in a limiting connotation since the latex composition and products made therefrom will find application in many industries.

EXAMPLE 1

A modified latex resin saturant having the following ingredients is prepared as described below:

|  | PARTS BY WEIGHT |
|---|---|
| MONOMER PHASE | |
| Styrene | 59.0 |
| Ethylacrylate | 41.0 |
| N-Methylolacrylamide | 2.0 |
| Water (contained in N-methylolacrylamide) | 1.3 |
| Isopropyl alcohol | 2.2 |
| AQUEOUS PHASE | |
| Dimineralized water | 79.5 |
| Seed latex 600A° 50% styrene - 50% butadiene | 2.1 |
| DOWFAX$^{(TM)}$2A-1 (sodium dodecyldiphenyl ether disulfonate) | 0.4 |
| Sodium dodecylbenzene sulfonate | 2.2 |
| Potassium persulfate | 1.0 |

The reaction vessel was charged with the seed latex, water and a portion of the emulsifier DOWFAX 2A-1.

The reactor was then purged with nitrogen for about 30 minutes and the temperature of the reaction mixture in vessel raised to 150° F. ± 1° F. (66° C.). A portion of the potassium persulfate initiator was then added to the reaction vessel. For the next 4½ hours the monomer phase and the remaining portion of the aqueous phase including the initiator and emulsifiers were added continuously through separate feed streams into the agitated reaction mixture being maintained at 150° F. ± 1° F.

The reaction mixture was maintained at 150° F. (66° C.) for approximately three hours following monomer and emulsifier addition. During this time, 0.02 part tertiarybutylhydroperoxide and 0.01 parts isoasborbic acid were added to control the odor and to reduce free monomer content of the latex. The pH value of the finish latex composition was adjusted with ammonium hydroxide to 7.0–8.0 and the total solids content regulated to 50–52%.

EXAMPLE 2

Six 8 × 8 inch sheets of non-woven polyester web were saturated with the cross-linking composition prepared in Example 1, squeeze rolled, dried for 15 minutes at 180° F. following by pressing at 28–30 lbs. in.² for 15 seconds at 180° F. Sheets prepared in this manner when immersed in acetone were observed. Swelling and softening indicating that cross-linking did not occur. Sheets prepared in this manner were then additionally exposed to heat i.e. 240° F., for 5 minutes. After cooling, the sheets were immersed in acetone. Observation of the sheets showed that they remained stiff and did not swell indicating that cross-linking reaction had taken place.

EXAMPLE 3

In a coating trial non-woven polyester web was unwound from a reel and fed into a coating pan containing the latex composition. The latex composition prepared as in Example 1 contained 50–52% solids. The non-woven web moved through a coating pan at approximately 15–18 ft/min. The latex saturated sheet went into a vertical tower dryer located 3–4 feet above the saturation pan and then into a second dryer and finally to the wind-up stand. The dryer temperatures were set at about 230° so that the web exited from the second dryer with a surface drying temperature of 180° F.

The saturated wound-up sheet was removed from the wind-up stand and samples of the material cut for evaluation. The samples were formed into box toes and counter parts by molding and forming at temperatures between 250°–275° F. The molding and forming step resulted in cross-linking taking place providing a stiff-rigid material useable in manufacturing shoes.

EXAMPLE 4

To determine proper drying conditions six different weight non-woven polyester webs were saturated with a latex cross-linking type web saturant made from monomers containing 59% styrene, 41% ethylacrylate, and 2%, based upon the weight of the monomers, N-methylolacrylamide. The latex was coated as received at 50.1% total solids an as made pH value of 2.6.

The Table below shows the results of a trial run.

| | Solubility Test in Acetone | | | | | |
|---|---|---|---|---|---|---|
| WEB | A | B | C | D | F[c] | G[c] |
| As Received | | | | | | |

| | Solubility Test in Acetone | | | | | |
|---|---|---|---|---|---|---|
| WEB | A | B | C | D | F[c] | G[c] |
| from Coater | S-F[a] | S-F | S-F | S-F | S-R[b] | S-R |
| 10 Minutes Cure at 125° C (263° F) Forced draft oven | S-R | S-R | S-R | S-R | S-R | S-R |

[a]S-F, indicates soft-flexible, no cross-linking has occurred.
[b]S-R, indicates stiff-rigid, cross-linking as taken place.
[c]Webs F and G were cross-linked during saturation and drying.

The webs decrease in weight per unit area from A to G. F and G, the lightest weight webs, cross-linked during the initial saturation and drying steps. This indicates that the latex, in order to prevent premature cross-linking should have been neutralized prior to the web saturation step.

EXAMPLE 5

Five rolls of non-woven polyester web were saturated as described in Example 3 with a neutralized latex cross-linking type saturant prepared as described in Example 1. The temperatures of both the tower and the tunnel dryers were controlled so that the saturated web exited at 180° F. from the tunnel dryer. Samples were periodically taken from the saturated and dried webs and checked for cross-linking. All samples were acetone swellable indicating that no cross-linking has taken place in any of the different webs.

Additional samples were subjected to 250°–275° F., cure for 3–5 minutes and then rechecked for cross-linking. All samples were acetone insoluble indicating that cross-linking had taken place. The amount of latex saturant consumed indicated that an average coating was approximately 13.5 ounces per square yards.

EXAMPLE 6

Following the procedure set forth in Example 1 a reaction vessel with an aqueous phase containing seed latex and a portion of a emulsifier, and an initiator is prepared and heated to about 150° F. A monomer mixture of 59 parts vinylidene chloride, 41 parts butylacrylate, and 2 parts N-methylolacrylamide, 2.2 parts isopropyl alcohol and the remaining initiator and emulsifiers may be added to the aqueous phase at 150° ± 1° F. continuously over a period of 4½ hours to complete the polymerization. The as manufactured pH of the latex composition may then be buffered to between 6.0–8.0 with a neutralizing agent selected from ammonium hydroxide, sodium hydroxide, potassium hydroxide, morpholine and mixtures thereof.

When the buffered latex is saturated on non-woven fibrous materials the saturated materials may be dried up to about 180° F. without cross-linking taking place.

EXAMPLE 7

In a manner similar to that described in Example 6 a buffered latex cross-linking saturant may be manufactured from a monomer mixture containing 59 parts methylmethacrylate, 41 parts methylacrylate, and 2 parts N-methylolacrylamide. After polymerization and neutralizing the cross-linking may be applied as described above and dried as described above without initating the cross-linking mechanism.

Having described the essence of my invention it is evident that many variations can be effected without departing from the limit of the invention as defined in the appended claims.

What I claim is:

1. The method of preparing a resin impregnated non-woven web having thermoplastic characteristics at temperatures below 190° F. and thermoset characteristics at temperatures above 190° F. comprising:
    (a) preparing a cross-linking latex composition by
        (1) charging a reaction vessel with a small amount of a seed latex polymer along with an initiator in an aqueous phase to provide nucleating sites for polymerization,
        (2) adding, substantially continuously, monomers and emulsifiers at a controlled rate, said monomer consisting essentially of about 59 parts by weight styrene, about 41 parts by weight ethylacrylate, and 2 parts by weight N-methylolacrylamide, the addition taking place at about 150° F. over a 4½ hour period,
        (3) post cooking the latex composition up to about three additional hours to reduce the free monomers content of the latex composition,
        (4) adjusting the latex composition after polymerization is completed from as manufactured state to a pH value between 6.0 and 8.0 with a neutralizing agent;
    (b) saturating a non-woven web with the adjusted latex composition;
    (c) drying the saturated web at a temperature below about 190° F. whereby an impregnated thermoplastic non-woven web having thermoset properties above 190° F. is produced.

2. The method of claim 1 wherein the neutralizing agent is selected from ammonium hydroxide, sodium hydroxide, potassium hydroxide, morpholine, methylamine, dimethylamine and mixtures thereof.

3. A method of preparing a resin impregnated non-woven fibrous web having thermoplastic characteristics at temperatures below 190° F. and thermoset characteristics at temperatures above about 190° F. comprising:
    (a) providing a storage stable one-package polymerized latex composition consisting essentially of the polymerization reaction product of
        (1) from about 40 to about 70 parts by weight of a first monomer selected from styrene, vinylidene chloride, methylmethacrylate, butylmethacrylate and mixtures thereof,
        (2) from about 30 to about 60 parts by weight of a second monomer selected from methylacrylate, ethylacrylate and butylacrylate, proplyacrylate, 2-ethylhexylacrylate, mixtures thereof, and,
        (3) from about 0.5 to about 6.0 parts by weight of N-methylolacrylamide;
    said composition having been treated with a neutralizing agent after completion of polymerization reaction to prevent cross-linking below temperatures of 190° F.;
    (b) applying said neutralized composition to a non-woven fibrous web to impregnate the web, and
    (c) drying the impregnated non-woven fibrous web at a temperature below 190° F.

4. The method of claim 3 wherein the neutralizing agent is selected from ammonium hydroxide, sodium hydroxide, potassium hydroxide, morpholine, methylamine, dimethylamine and mixtures thereof.

5. The process of claim 4 wherein the first monomer is 59 parts by weight and is styrene, the second monomer is 41 parts by weight and is ethylacrylate, and N-methylolacrylamide is 2 parts by weight.

6. A process for forming a thermoplastic heat stable stock material for later cross-linking by saturating a non-woven web with a cross-linking resin saturant having cross-linking reaction activation temperature above 190° F. comprising the steps of:
    (a) preparing a polymerized resin composition consisting essentially the polymerization reaction product of:
        (1) from about 40 to about 70% by weight of a first monomer selected from styrene, vinylidene chloride, methylmethacrylate, butylmethacrylate and mixtures thereof,
        (2) from about 30 to about 60% by weight of a second monomer selected from methylacrylate, ethylacrylate, butylacrylate, propylacrylate, 2-ethylhexylacrylate, and mixtures thereof, and,
        (3) from about 0.5 to about 6.0% by weight of N-methylolacrylamide;
    said composition having been treated with a neutralizing agent upon completion of polymerization reaction to prevent cross-linking below 190° F.;
    (b) saturating a non-woven web with the resin from step (a);
    (c) drying the resin saturated web at a temperature below the cross-linking temperature of the resin whereby a thermoplastic stock material having thermoset properties is produced.

7. The process of claim 6 wherein the first monomer is 59% and is styrene, the second monomer is 41% and is ethylacrylate, and N-methylolacrylamide is 2%.

8. The process of claim 7 wherein the neutralizing agent is selected from ammonium hydroxide, morpholine, potassium hydroxide, sodium hydroxide, methylamine, dimethylamine and mixtures thereof.

9. A process for treating a non-woven web which comprises:
    (a) contacting said web with a thermosetting latex saturant composition having thermoplastic characteristics at temperatures below about 190° F. when dried on a non-woven fibrous material consisting essentially of a polymerization reaction product of:
        (1) 40 to 70 parts by weight of a first monomer selected from styrene, vinylidene chloride, methylmethacrylate, butylmethacrylate and mixtures thereof,
        (2) 30 to 60 parts by weight of a second monomer selected from methylacrylate, ethylacrylate, butylacrylate, propylacrylate, 2-ethylhexylacrylate and mixtures thereof, and
        (3) 0.5 to 6 parts by weight of N-methylolacrylamide, said product buffered to a pH range of from about 6.0 to about 8.0 with a neutralizing agent after completion of polymerization reaction;
    to impregnate said web with said composition, and
    (b) drying the impregnated web at temperatures below about 190° F. whereby the impregnated web has thermoplastic characteristics.

10. The process of claim 9 including the additional step of thermally cross-linking the impregnated web by heating to a temperature above 190° F. to thermoset said composition on said web.